May 3, 1949. H. R. HARDING 2,469,111
LOCKED COUPLING
Filed Dec. 26, 1947

INVENTOR.
HIRAM R. HARDING
BY Howard J. Whelan,
ATTORNEY

Patented May 3, 1949

2,469,111

UNITED STATES PATENT OFFICE 2,469,111

LOCKED COUPLING

Hiram R. Harding, Baltimore, Md., assignor of fifty per cent to Harry E. Karr, Baltimore County, Md., and twenty-five per cent to Logan C. Harding, Hopewell, Va.

Application December 26, 1947, Serial No. 793,917

3 Claims. (Cl. 285—122)

This invention relates to couplings and unions for pipes, tubes, or rods and more particularly to those having a locking feature tending to keep them from loosening under normal operating conditions.

The conventional coupling or union for piping is screwed in place on the ends of two pipes which are brought together and depends entirely on the ordinary cooperating screw threads to hold the coupling on and the pipes attached thereto. There is a tendency for the coupling to unscrew from the pipe ends in locations where there is appreciable vibration since friction is the only force holding it in place, assuming that cement is not used on the threads. There is a little resiliency due to the squeezing action of the coupling on the pipe threads but same is inconsequential in practice. Where piping used is of such a nature as to require exceptional tightness under severe vibrational conditions, the conventional coupling is not satisfactory due to its tendency to unloosen.

It is an object of this invention to provide a new and improved locking coupling that will avoid one or more of the disadvantages and limitations of the prior art.

Another object of the present invention is to provide a new and improved locking coupling that will afford an arrangement in its structure for greatly increasing its binding power to prevent an unlocking of the coupling from piping to which it is attached, under conditions of general use, but allowing it to be unloosened with a wrench suitable for it, when necessary.

A further object of the invention is to provide a new and improved coupling or union for rods, piping and tubing that can be tightened to prevent leakage at its joints and bind against the wall of the piping as the screw attachment is attached.

Other objects will become apparent as the invention is more fully set forth.

For a better understanding of the invention, and the principles thereof, reference is made to the appended drawings, wherein a particular form of the invention is indicated, by way of example. These drawings and the following description together describe the particular design in detail, while the scope of the invention is particularly pointed out in the claims.

In the drawings.

Similar reference numerals pertain to the same parts throughout the drawings.

Figure 1:
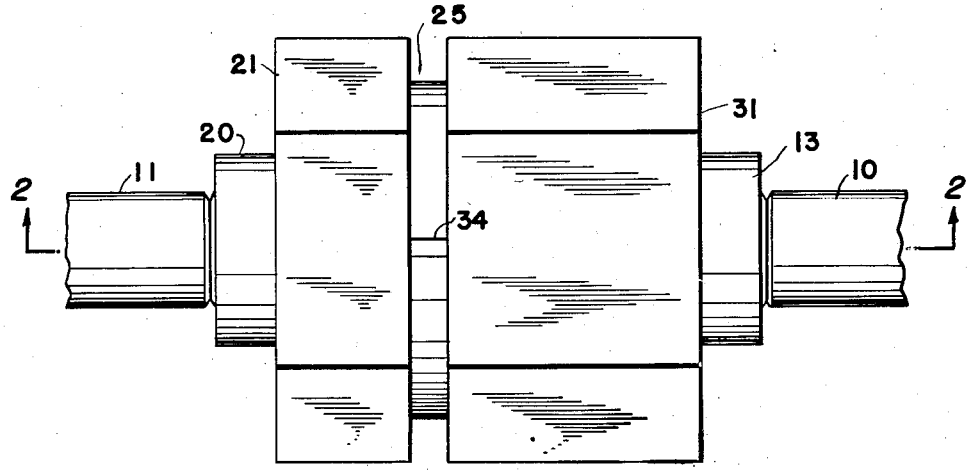
Figure 1 is a plan view of a locked pipe and tube coupler embodying this invention, and coupling two pipe end portions together.
Figure 2:
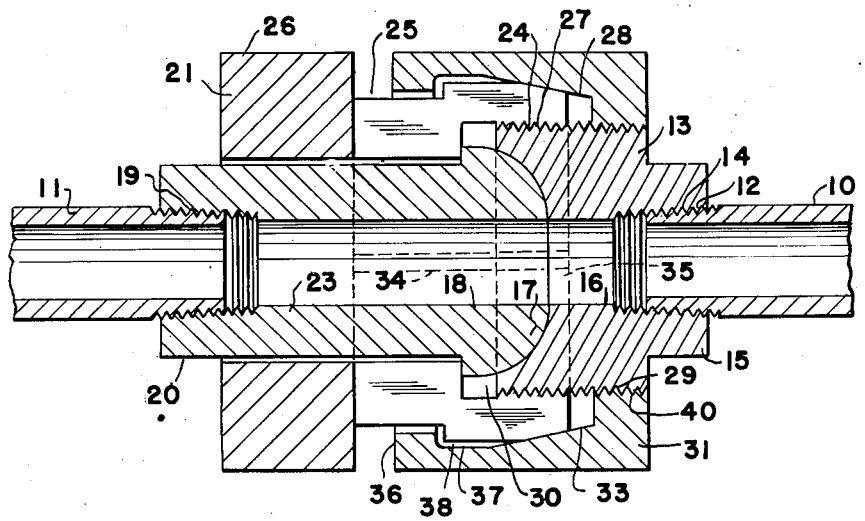
Figure 2 is a sectional view taken along line 2—2 of Figure 1.

Referring to Figure 2: A pipe coupling or union is shown connected to the end portions 10 and 11 of two pieces of standard piping. The tapered screw threads 12 of the end 10 threads into the internal screw threads 14 of an upper barrel 13 in its upper portion 15. The portion 15 is preferably externally contoured to form a hexagon nut. A central passage 16 passes through the barrel 13 longitudinally, and at the end opposite to the threads 14 opens up into an arcuate dome 17 into which the head 18 of a lower barrel 20 fits closely. This lower barrel 20 has internal screw threads 19 into which the second pipe 11 is threaded. The exterior of the barrel 20 under the head is cylindrical and smooth and is fitted into the central longitudinal passage 22 of a wedge nut element 21. A longitudinal passage 23 is provided in the barrel 20 similar to the passage 16 with which it aligns. The wedge nut element 21 has its upper portion 24 exteriorly tapered. It is also undercut, by the provision of a peripheral groove 25, back of which is an enlarged portion 26 externally contoured to a hexagonal nut form. The interior 27 of the upper portion is screw threaded at 28 to fit on the inner end portion of the external screw threads 29 of the barrel 13. An internal undercut circular groove 30 under or adjacent the threads 28 provides a space for adjusting the position of the element 21 on the barrel 13. A hexagonal cap 31 is drilled and tapped at 40 to enable it to be screwed on the threads 29 until its tapered inner wall 33 engages with the tapered wall 24 of the element 21. When so engaged the further screwing of the element 21 into the cap 31 causes the face portion 24 to be pressed downward by the face 33 of the cap 31. This portion 24 is cut through transversely to form several longitudinal slots 34 and is thereby divided into sections 35. To force the sections inwardly the wedging pressure is increased on the element 21 by the cap 31. Inwardly turned flange 36 on the lower edge of the cap 31 fits in the groove 25 under the extending lip 37, so as to be locked in place thereon. A space 38 is arranged adjacently to the lip 37 and inner surface of the cap 31 to enable adjustment to be made without interference. The groove 25 is large compared with the thickness of the lip 37 to also enable adjustment to be made on the tapered surfaces 24 and 33 riding on each other, when the cap 31 is screwed down on the barrel 13 and the wedge nut 21 is screwed therein.

After the pipes are attached to the barrels 13 and 20, the wedging element 21 is screwed up with the cap 31, on the screw threads at 27 and 28. This forces the contacting tapered surfaces 24 and 33 against each other, and forces in the sections 35 inwardly against the threads 29 and binds them tightly on them. The wedge nut element 21 is forced up tight by screwing it on the barrel 13 after the pipes 10 and 11 are threaded on as securely as possible. This increases the pressure on the barrels 13 and 20 on the peripheral surfaces of the barrels and holds them together more substantially, with the cap 31 doing its part in this connection.

While but one form of the invention is shown in the drawings and described in the specifications it is not desired to limit this application for patent to this particular form or in any other way otherwise than limited by the scope thereof, as it is appreciated that other forms could be made that would use the same principles and come within the scope of the appended claims.

Having thus described the invention what is claimed is:

1. A union for the coupling of plural pipes, comprising in combination, a lower barrel of cylindrical form including one end portion enlarged and exteriorly rounded into a quasi-hemispherical form, said lower barrel having a central passage therethrough with the portion opposite to said enlarged end portion provided with means to receive and hold a pipe end portion of predetermined size, an upper barrel exteriorly screw threaded and having a central passage therethrough having a portion provided with means to hold another end portion of pipe and including an arcuate recess in one of its faces conforming with the contour of said first mentioned enlarged end portion of said lower barrel whereby it may receive same and permit a ball-joint-like adjustment therein, a wedge-nut element having an exterior portion formed for tool operation and interiorly provided with a passage to allow the cylindrical portion of the lower barrel to pass therethrough, but to stop same when enlarged end portion contacts said wedge-nut, said element including an extending cylindrical portion of lesser diameter than its tool operation portion from which extends a tapering wedge-like end formation including an internal screwthread, engageable with the screwthreads on the exterior of said upper barrel so as to be adjustable longitudinally thereon, and a cap interiorly screwthreaded at a predetermined portion thereof to screw on to said upper barrel and including a converging recessed interior surface alignable with said wedge-like formation so as to coact therewith and induce a compressive binding thereon as the wedge-nut element is screwed further on said upper barrel to bring the element and cap closer together and thereby make a tighter and leak-proof connection about the ends of the pipes.

2. A union for the coupling of plural pipes, comprising in combination, a lower barrel of cylindrical form including one end portion enlarged and exteriorly rounded into a quasi-hemispherical form, said lower barrel having a central passage therethrough with the portion opposite to said enlarged end portion provided with means to receive and hold a pipe end portion of predetermined size, an upper barrel exteriorly screw threaded and having a central passage therethrough having a portion provided with means to hold another end portion of pipe and including an arcuate recess in one of its faces conforming with the contour of said first mentioned enlarged end portion of said lower barrel whereby it may receive same and permit a ball-joint-like adjustment therein, a wedge-nut element having an exterior portion formed for tool operation and interiorly provided with a passage to allow the cylindrical portion of the lower barrel to pass therethrough, but to stop same when enlarged end portion contacts said wedge-nut, said element including an extending cylindrical portion of lesser diameter than its tool operation portion from which extends a tapering wedge-like end formation including an internal screwthread, engageable with the screwthreads on the exterior of said upper barrel so as to be adjustable longitudinally thereon, a cap interiorly screwthreaded at a predetermined portion thereof to screw on to said upper barrel and including a converging recessed interior surface alignable with said wedge-like formation so as to coact therewith and induce a compressive binding thereon as the wedge-nut element is screwed further on said upper barrel to bring the element and cap closer together and thereby make a tighter and leak-proof connection about the ends of the pipes, said cap having an inner flange extending inwardly to encompass a peripheral portion of the wedge-nut element and serve to hold them from separating from each other.

3. A union for the coupling of plural pipes, comprising in combination, a lower barrel of cylindrical form including one end portion enlarged and exteriorly rounded into a quasi-hemispherical form, said lower barrel having a central passage therethrough with the portion opposite to said enlarged end portion provided with means to receive and hold a pipe end portion of predetermined size, an upper barrel exteriorly screwthreaded and having a central passage therethrough having a portion provided with means to hold another end portion of pipe and including an arcuate recess in one of its faces conforming with the contour of said first mentioned enlarged end portion of said lower barrel whereby it may receive same and permit a ball-joint-like adjustment therein, a wedge-nut element having an exterior portion formed for tool operation and interiorly provided with a passage to allow the cylindrical portion of the lower barrel to pass therethrough, but to stop same when enlarged end portion contacts said wedge-nut, said element including an extending cylindrical portion of lesser diameter than its tool operation portion from which extends a tapering wedge-like end formation including an internal screwthread, engageable with the screwthreads on the exterior of said upper barrel so as to be adjustable longitudinally thereon, a cap interiorly screwthreaded at a predetermined portion thereof to screw on to said upper barrel and including a converging recessed interior surface alignable with said wedge-like formation so as to coact therewith and induce a compressive binding thereon as the wedge-nut element is screwed further on said upper barrel to bring the element and cap closer together and thereby make a tighter and leak-proof connection about the ends of the pipes, said cap having an inner flange extending inwardly to encompass a peripheral portion of the wedge-nut element and serve to hold them from separating from each other, the said wedge-nut element having longitudinal slots in its extending portions to permit a resilient movement of their walls that a varying adjustment of said binding action may be had to suit the position of the cap when screwed on to the upper barrel and of the wedge-like formation thereof.

HIRAM R. HARDING.

REFERENCES CITED

The following references are of record in the file of this patent:

UNITED STATES PATENTS

| Number | Name | Date |
| --- | --- | --- |
| 769,380 | Hicks | Sept. 6, 1904 |
| 1,166,538 | Nesbit | Jan. 4, 1916 |
| 1,175,283 | March | Mar. 14, 1916 |
| 1,179,110 | Kimman | Apr. 11, 1916 |
| 1,811,736 | Benzel | June 23, 1931 |
| 2,371,971 | Main et al. | Mar. 20, 1945 |
| 2,376,058 | Jeffreys | May 15, 1945 |